United States Patent
Balogh et al.

(10) Patent No.: US 11,643,135 B2
(45) Date of Patent: May 9, 2023

(54) CONTROLLER WITH AN EARLY WARNING FUNCTION DESIGNED TO DETECT A SIGNAL REDUCTION PRESENT IN A HARDWARE COMPONENT

(71) Applicants: thyssenkrupp Presta AG, Eschen (LI); thyssenkrupp AG, Essen (DE)

(72) Inventors: Andras Balogh, Tordas (HU); Gábor Kalapos, Gyömrő (HU)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 260 days.

(21) Appl. No.: 17/270,920

(22) PCT Filed: Sep. 19, 2019

(86) PCT No.: PCT/EP2019/075131
§ 371 (c)(1),
(2) Date: Feb. 24, 2021

(87) PCT Pub. No.: WO2020/064493
PCT Pub. Date: Apr. 2, 2020

(65) Prior Publication Data
US 2021/0188346 A1    Jun. 24, 2021

(30) Foreign Application Priority Data
Sep. 27, 2018 (DE) ................ 10 2018 123 890.8

(51) Int. Cl.
*B62D 5/04* (2006.01)
*G07C 5/08* (2006.01)

(52) U.S. Cl.
CPC ......... *B62D 5/0481* (2013.01); *B62D 5/0493* (2013.01); *G07C 5/0808* (2013.01); *G07C 5/0816* (2013.01)

(58) Field of Classification Search
CPC .. B62D 5/0481; B62D 5/0493; G07C 5/0808; G07C 5/0816
See application file for complete search history.

(56) References Cited

U.S. PATENT DOCUMENTS

2003/0142346 A1   7/2003 Shirotori et al.
2008/0147276 A1   6/2008 Pattok et al.
(Continued)

FOREIGN PATENT DOCUMENTS

CN            105955236 A    9/2016
DE    10 2004 028 827 A    1/2006
(Continued)

OTHER PUBLICATIONS

English Translation of International Search Report issued in PCT/EP2019/075131, dated Dec. 17, 2019.

*Primary Examiner* — Mathew Franklin Gordon
(74) *Attorney, Agent, or Firm* — thyssenkrupp North America, LLC

(57) ABSTRACT

A controller may have a plurality of self-diagnostic functions, each of which is configured for checking a function of an assigned hardware component of the controller. Each of the self-diagnostic functions may have at least one safety limit value, which is configured such that when the at least one safety limit value is exceeded the corresponding hardware component is switched off. Each of the self-diagnostic functions may have at least one quality limit value, the absolute value of which is smaller than an absolute value of the at least one safety limit value. The at least one quality limit value can be configured such that a quality-relevant state can be detected in the assigned hardware component when the at least one quality limit value is exceeded.

15 Claims, 1 Drawing Sheet

(56) References Cited

U.S. PATENT DOCUMENTS

2010/0274437 A1   10/2010  Kluge
2015/0226789 A1    8/2015  Munson et al.
2017/0144698 A1    5/2017  Bourdrez

FOREIGN PATENT DOCUMENTS

| DE | 10 2009 002 594 B | 12/2010 |
| DE | 10 2010 062 499 A | 6/2012 |
| DE | 10 2015 208 818 A | 11/2016 |
| DE | 10 2015 217 158 A | 3/2017 |
| EP | 0 949 122 A | 10/1999 |
| EP | 3 129 273 B | 1/2018 |
| GB | 2567431 A | 4/2019 |
| WO | 2016/180586 A1 | 11/2016 |

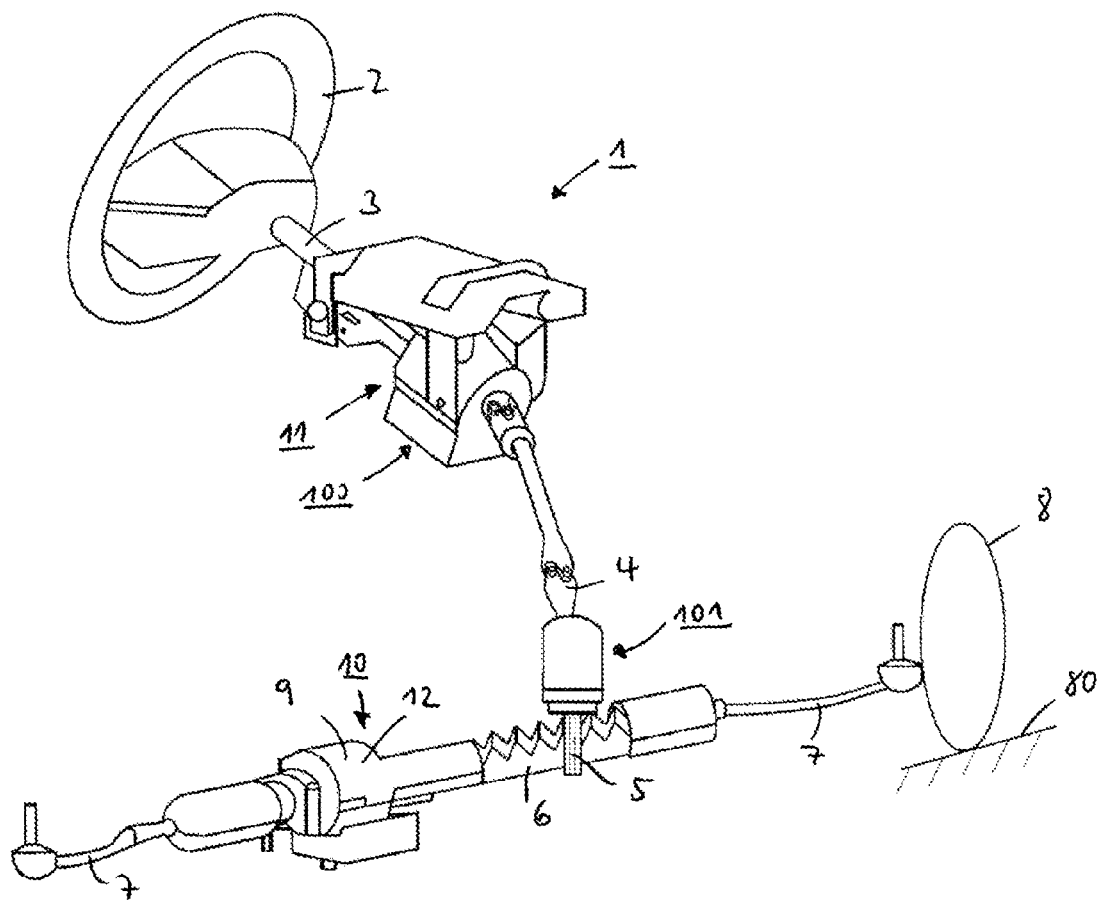

CONTROLLER WITH AN EARLY WARNING FUNCTION DESIGNED TO DETECT A SIGNAL REDUCTION PRESENT IN A HARDWARE COMPONENT

CROSS REFERENCE TO RELATED APPLICATIONS

This application is a U.S. National Stage Entry of International Patent Application Serial Number PCT/EP2019/075131, filed Sep. 19, 2019, which claims priority to German Patent Application No. DE 10 2018 123 890.8, filed Sep. 27, 2018, the entire contents of both of which are incorporated herein by reference.

FIELD

The present disclosure generally relates to controllers, electromechanical steering systems with controllers, and methods for checking hardware of controllers.

BACKGROUND

In the case of electromechanical motor vehicle steering systems, a failure of the steering results in a safety-critical state of the motor vehicle. A failure of the steering must therefore be prevented, in particular during autonomous travel. It is therefore desirable that the driver and/or the motor vehicle workshop be informed early regarding possible problems arising in the future, in order to ensure that a failure does not occur in the first place.

It is known that steering systems have a reduced signal quality over time, which can arise, for example, due to aging hardware components, in particular due to circuit board faults in the control unit (ECU). Such circuit board faults can arise, for example, due to CAF (conductive anodic filament). CAF is a form of electrochemical filigree corrosion, in which electrically conductive (copper) filaments (threads) grow, emanating from the anode and under the circuit board surface, in the direction of the cathode. The copper migration results in conductive paths, so-called pathways, which reduce the insulation resistance between the voltage-conducting strip conductors. Between supply lines, this causes a short circuit in the extreme case; between signal lines, the result is an interruption or a failure of the assembly. As soon as the insulation resistance is less than a certain predefined threshold, which is defined by a self-diagnostic function, the circuit board suddenly loses functionality due to a shutdown. Since the components are safety-relevant, a loss of functionality is undesirable. The driver and/or the motor vehicle workshop assume(s) that the components operate correctly until the component loses functionality. Age-induced changes are not communicated.

Patent document EP 3 129 273 B1 describes a method for managing power-assisted steering, in which the aging of the steering mechanism is estimated by means of an aging function. The aging function is dependent upon a time integral over the intensity of a force applied in the steering mechanism. The estimated age is utilized for adapting a friction model utilized in the steering mechanism and/or an elasticity table and/or the stiffness of the steering mechanism, in order to improve the steering feel.

Thus, a need exists for a controller for a steering system of a motor vehicle, in which an aging of the signal quality of the controller is detected, in order to inform a driver or a motor vehicle workshop early regarding future problems.

BRIEF DESCRIPTION OF THE FIGURE

The FIGURE is a schematic view of an example electromechanical motor vehicle steering system.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a controller for a steering system of a motor vehicle is provided with a plurality of self-diagnostic functions, each of which is configured for checking a function of an assigned hardware component of the controller, wherein each of the self-diagnostic functions has at least one safety limit value, which is configured in such a way that, when the at least one safety limit value is exceeded, the corresponding hardware component is switched off. In addition, at least one self-diagnostic function has at least one quality limit value, the absolute value of which is smaller than the absolute value of the at least one safety limit value of the same self-diagnostic function, wherein the at least one quality limit value is configured in such a way that a quality-relevant state can be detected in the assigned hardware component when the at least one quality limit value is exceeded. The at least one quality limit value makes it possible to detect a reduction of the quality of the hardware component before it fails. The driver and/or mechanic therefore have/has sufficient time to initiate a countermeasure, in order to avoid the occurrence of a safety-critical state of the steering. Hardware components are the components arranged on the circuit board and the circuit board itself. Preferably, multiple self-diagnostic functions have assigned quality limit values.

Preferably, a reduced electrical signal quality in the corresponding hardware component is a quality-relevant state.

Preferably, an evaluation unit is provided, which stores the presence of a quality-relevant state in the form of a coding. It can be provided that the evaluation unit evaluates the stored codes and is designed for forwarding a signal to a warning unit. The warning unit can inform the driver and/or the workshop of the presence of the loss of quality in the controller.

Moreover, an electromechanical steering system for a motor vehicle is provided, including
   at least one electric motor,
   a torque sensor, which detects a torque applied by the driver, and
   an electronic control unit for calculating motor currents for operating the electric motor, which comprises an above-described controller. The aforementioned advantages also result here.

Preferably, at least one warning unit is arranged in the motor vehicle, which informs the driver of the vehicle and/or a motor vehicle workshop of the presence of a quality-relevant state.

In addition, a method is provided for checking hardware components of a controller in an electromechanical steering system of a motor vehicle, wherein the controller comprises a plurality of self-diagnostic functions, which check a functionality of an assigned hardware component, wherein the self-diagnostic functions comprise at least one safety limit value, and the method comprises the following steps:
  outputting a value of a self-diagnostic function,
  checking whether the value exceeds the at least one assigned safety limit value,
  detecting an exceedance of the at least one safety limit value and switching off the corresponding hardware component, wherein at least one of the self-diagnostic functions comprises at least one quality limit value, the absolute value of which is smaller than the absolute value of the at least one safety limit value assigned to the same self-diagnostic function, and that the method comprises the following further steps:
  checking whether the value exceeds the at least one assigned quality limit value,
  detecting an exceedance of the at least one quality limit value,
  detecting a presence of a quality-relevant state.

The method allows for a check of the quality of the hardware of the control unit in a simple and cost-effective manner. Preferably, several of the self-diagnostic functions have quality limit values.

Preferably, the following further method step is provided:
  storing a code assigned to the quality-relevant state.

The quality limit values are advantageously formed in such a way that a reduced electrical signal quality in the corresponding hardware component is detected as a quality-relevant state.

The following further method steps can be provided:
  evaluating the quality-relevant state in an evaluation unit and forwarding a quality-relevant state to a warning unit,
  outputting a warning signal by the warning unit, whereby the driver of the vehicle and/or a motor vehicle workshop are/is informed of the presence of a quality-relevant state.

In one preferred embodiment, the following further method step is provided:
  outputting a reference to a necessary countermeasure stored with respect to the quality-relevant state. In this way, the driver and/or the workshop directly arrive(s) at the information necessary for the repair of the control unit.

It is advantageous when the evaluation unit comprises a filter, fault counters, and/or statistical measures that prevent an unnecessary triggering of a warning signal in the warning unit. For the case in which a fault counter is utilized in the evaluation unit, the fault counter preferably has a limit value, wherein the forwarding of a quality-relevant state to the warning unit is triggered not before an exceedance of the limit value.

The code of the quality-relevant states is preferably a DTC.

Advantageously, the quality limit values are formed in such a way that a reduction of the insulation resistance of the circuit board by CAF is detected as a quality-relevant state.

One preferred embodiment of the invention is explained in greater detail in the following with reference to FIG. 1.

FIG. 1 shows a schematic representation of an electromechanical motor vehicle steering system 1 with a steering wheel 2, which is coupled to an upper steering shaft 3 in a rotationally fixed manner. Via the steering wheel 2, the driver introduces an appropriate torque, as a steering command, into the steering shaft 3. The torque is then transmitted via the upper steering shaft 3 and the lower steering shaft 4 onto a steering pinion 5. The pinion 5 meshes, in a known way, with a toothed segment of a rack 6. The rack 6 is mounted in a steering housing in such a way as to be displaceable in the direction of its longitudinal axis. At its free end, the rack 6 is connected to tie rods 7 via ball-and-socket joints (not represented). The tie rods 7 themselves are connected, in a known way, via steering knuckles to a steered wheel 8 of the motor vehicle in each case. A turning of the steering wheel 2 results, via the connection of the steering shaft 3 and of the pinion 5, in a longitudinal displacement of the rack 6 and, thereby, to a swiveling of the steered wheels 8. The steered wheels 8 experience a reaction via a roadway 80, which counteracts the steering motion. Consequently, in order to swivel the wheels 8, a force is necessary, which makes an appropriate torque necessary at the steering wheel 2. An electric motor 9 of a servo unit 10 is provided, in order to assist the driver in this steering motion.

The upper steering shaft 3 and the lower steering shaft 4 are coupled to each other in a torsionally elastic manner via a torsion bar (not represented). A torque sensor unit 11 detects the twisting of the upper steering shaft 3 with respect to the lower steering shaft 4 as a measure of the torque manually applied at the steering shaft 3 or the steering wheel 2. Depending on the torque measured by the torque sensor unit 11, the servo unit 10 provides steering assistance for the driver. The servo unit 10, as the power assistance unit 10, 100, 101, can be coupled either to a steering shaft 3, the steering pinion 5, or the rack 6. The particular power assistance 10, 100, 101 introduces a servo-assisted torque into the steering shaft 3, the steering pinion 5, and/or into the rack 6, whereby the driver is assisted in the steering work. The three different power assistance units 10, 100, 101 represented in FIG. 1 show alternative positions for their arrangement. Usually, only one of the shown positions is occupied by a power assistance. The servo unit 10 comprises an electronic control unit with the controller (ECU) 12 for calculating the steering assistance.

The controller 12 comprises, within the scope of a safety concept, a plurality of self-diagnostic functions, each of which checks a functionality of an assigned hardware component of the controller 12. Each self-diagnostic function has safety limit values, wherein the hardware component is shut down (switched off) when the value of the self-diagnostic function is outside these safety limit values. In addition to the safety limit values, quality limit values are provided, which are more narrowly defined than the safety limit values, i.e., the absolute value of the safety limit values is greater than the absolute value of the quality limit values. The quality limit values are defined in such a way that an exceedance of the quality limit values indicates a reduced signal quality in the corresponding hardware component. A specific, quality-related coding (diagnostic trouble code, DTC) is provided for the exceedance of the quality limits, wherein a single, individual code is unambiguously assigned to an appropriate self-diagnostic function. If a quality limit is exceeded, the appropriate code is stored. It is preferably provided that at least one warning unit is arranged in the motor vehicle, which informs the driver of the vehicle and/or the motor vehicle workshop of the reduced signal quality in the ECU. The warning can take place acoustically, for example, via voice output, or optically, for example, via warning lights in the instrument panel or via warning messages on a screen, for example, via moving windows, so-called pop-up windows. The warning preferably takes place with reference to the particular DTC. It is also conceivable that the warning takes place independently of the specific DTC and the code and a possible reference to a countermeasure can first be read out with an external diagnostic device.

For the case that, due to CAF, there is a reduced insulation resistance between the voltage-conducting strip conductors on a circuit board of the ECU, a pair of the self-diagnostic functions known from the related art will detect the exceedance of their quality limits and inform the driver of the motor vehicle or the motor vehicle workshop or a mechanic thereof and, preferably, refer to necessary countermeasures. The functionality of the hardware is not stopped, since the safety limit values have not yet been exceeded. The driver or the mechanic therefore has sufficient time to initiate the countermeasure and avoid a failure of the steering.

Preferably, filters, fault counters, and/or statistical measures are provided, in order to prevent an unnecessary triggering of a signal in the warning unit. The fault counter preferably has a limit value (debounce limit), wherein only an exceedance of the limit value triggers the detection of a loss of quality. The software necessary for triggering a warning signal can gather data for hours up to days before the warning unit actually triggers a signal.

What is claimed is:

1. A controller for steering of a motor vehicle with self-diagnostic functions each of which is configured for checking a function of an assigned hardware component of the controller, wherein each of the self-diagnostic functions has a safety limit value configured such that when the safety limit value is exceeded the assigned hardware component is switched off, wherein at least one of the self-diagnostic functions has a quality limit value whereby an absolute value of the quality limit value is less than an absolute value of the safety limit value, wherein the quality limit value is configured such that a quality-relevant state is detectable in the assigned hardware component when the quality limit value is exceeded.

2. The controller of claim 1 wherein the quality-relevant state is a reduced-quality electrical signal.

3. The controller of claim 1 comprising an evaluation unit configured to store a presence of the quality-relevant state as coding.

4. The controller of claim 3 wherein the evaluation unit is configured to evaluate the stored coding and forward a signal to a warning unit.

5. An electromechanical steering system for a motor vehicle, the electromechanical steering system comprising:
an electric motor;
a torque sensor configured to detect a torque applied by a driver; and
an electronic control unit configured to calculate motor currents for operating the electric motor, the electronic control unit including a controller with self-diagnostic functions each of which is configured for checking a function of an assigned hardware component of the controller, wherein each of the self-diagnostic functions has a safety limit value configured such that when the safety limit value is exceeded the assigned hardware component is switched off, wherein at least one of the self-diagnostic functions has a quality limit value whereby an absolute value of the quality limit value is less than an absolute value of the safety limit value, wherein the quality limit value is configured such that a quality-relevant state is detectable in the assigned hardware component when the quality limit value is exceeded.

6. A motor vehicle comprising:
the electromechanical steering system of claim 5;
a warning unit configured to inform at least one of a driver or a motor vehicle workshop of a presence of the quality-relevant state.

7. A method for checking hardware components of a controller in an electromechanical steering system of a motor vehicle, wherein the controller comprises self-diagnostic functions each of which is configured to check a functionality of an assigned hardware component, wherein each self-diagnostic function includes a safety limit value, wherein at least one of the self-diagnostic functions includes a quality limit value whereby an absolute value of the quality limit value is less than an absolute value of the safety limit value assigned to the at least one of the self-diagnostic functions, the method comprising:
outputting a value of a first of the self-diagnostic functions;
checking whether the value exceeds a quality limit value for the first self-diagnostic function;
detecting an exceedance of the quality limit value and thus a presence of a quality-relevant state;
checking whether a safety limit value has been exceeded in the first self-diagnostic function or a second of the self-diagnostic functions; and
detecting an exceedance of the safety limit value in the first or second self-diagnostic function and switching off the assigned hardware component for the first or second self-diagnostic function.

8. The method of claim 7 comprising storing a code assigned to the quality-relevant state.

9. The method of claim 7 wherein the quality-relevant state is a reduced-quality electrical signal in the assigned hardware component.

10. The method of claim 7 comprising outputting a reference to a countermeasure stored with respect to the quality-relevant state.

11. The method of claim 7 comprising:
evaluating the quality-relevant state in an evaluation unit and forwarding the quality-relevant state to a warning unit; and
outputting a warning signal with the warning unit whereby at least one of a driver or a motor vehicle workshop is informed of the presence of the quality-relevant state.

12. The method of claim 11 wherein the evaluation unit comprises at least one of a filter, a fault counter, or statistical measures that prevent unnecessary triggering of the warning signal in the warning unit.

13. The method of claim 12 wherein the fault counter includes a limit value, wherein only exceedance of the limit value triggers the forwarding of the quality-relevant state to the warning unit.

14. The method of claim 7 comprising storing a diagnostic trouble code assigned to the quality-relevant state.

15. The method of claim 7 wherein the quality-relevant state corresponds to a reduction of an insulation resistance of a circuit board by conductive anodic filament.

* * * * *